UNITED STATES PATENT OFFICE.

FRANK MARQUARD, OF NEW YORK, N. Y.

INSULATING COMPOSITION.

SPECIFICATION forming part of Letters Patent No. 407,938, dated July 30, 1889.

Application filed December 3, 1888. Serial No. 292,511. (No specimens.)

*To all whom it may concern:*

Be it known that I, FRANK MARQUARD, of the city, county, and State of New York, have invented a new and Improved Insulating Composition; and the following is declared to be a full, clear, and exact description of the same.

My improved composition is adapted for various uses in the arts, especially in connection with electric lighting and signaling apparatus.

My improved composition consists of rosewood sawdust, extract of logwood, bichromate of potash, sulphate of iron, and an albuminous substance—such as bullock's blood—and said ingredients are compounded in about the proportion of twenty pounds of fine rosewood sawdust, one pound of extract of logwood, one-eighth of a pound of bichromate of potash, one-eighth of a pound of sulphate of iron, and five pounds of an albuminous substance. These before-named ingredients are thoroughly mixed together in about the proportions stated, which thorough mixing reduces the compound to a plastic state, in which plastic state the compound is molded under a slight pressure into the general shape and configuration of the article to be made, and the same is then put away to thoroughly dry. When thoroughly dried, the compound article is subjected to a very heavy pressure (preferably hydraulic) in dies or molds of the shape of the finished article, and these dies or molds should be heated to about 300°, or, in other words, into a condition that might be termed "hissing hot."

The composition, after thorough mixing and after it has been allowed to dry, might be reduced to an impalpable powder and then pressed to the desired form in dies or molds, as heretofore mentioned.

I may find it preferable sometimes to add to the composition in its plastic state a quantity of vegetable fiber—such as hemp, flax, &c. The addition to the composition of this fiber imparts a degree of elasticity which is otherwise absent, the same being desirable in some of the forms into which the composition may be made.

I would remark that I prefer to employ rosewood sawdust in contradistinction to any other wood, because the same possesses a natural resinous oil, which assists very materially in uniting the particles of the composition together; and I prefer to employ bullock's blood for the albumen in preference to any other albuminous substance, because the same is inexpensive and the color thereof assists in coloring the composition, which, together with the extract of logwood, makes the composition almost black, and the sulphate of iron in the composition acts on the logwood chemically to turn the same black, its influence permeating the whole mass. The bichromate of potash acts on the albumen to make the same insoluble. From these statements it will be seen that my improved composition is not only black, but that the same is insoluble and consequently waterproof, and, having been pressed in heated molds, that the same is very compact and hard; and my improved composition is found to be a very good non-conductor of electricity. Consequently it is adapted for use in the arts in connection with electric lighting and signaling apparatus for such parts of the apparatus as insulators, lamp-bases, rings, and various other appliances through which electric wires pass, and upon which as bases electric apparatus is constructed; and I would remark that my improved composition can be formed into sheets of varying width and thickness, which sheets can be cut up into pieces, the pieces being turned up or otherwise formed of the desired shape; and my improved composition is capable of taking on a high polish.

I do not confine myself to the exact proportions herein stated, nor to such articles as are named into which it is possible to form my composition, as the same is adapted for other uses in the arts than those specially named.

I claim as my invention—

1. The insulating compound herein described, composed of rosewood sawdust, extract of logwood, bichromate of potash, sulphate of iron, and an albuminous substance, substantially as set forth.

2. The insulating compound herein described, composed of the following ingredients, in about the following proportions: twenty pounds, by weight, of fine rosewood sawdust, one pound of extract of logwood, one-eighth of a pound of bichromate of potash, one-eighth of a pound of sulphate of iron, and five pounds of an albuminous substance, substantially as set forth.

3. The insulating compound herein described, composed of the following ingredients, in about the following proportions: twenty pounds, by weight, of fine rosewood sawdust, one pound of extract of logwood, one-eighth of a pound of bichromate of potash, one-eighth of a pound of sulphate of iron, and five pounds of an albuminous substance, and a vegetable fiber, such as hemp, flax, &c., substantially as set forth.

Signed by me this 1st day of December, A. D. 1888.

FRANK MARQUARD.

Witnesses:
GEO. T. PINCKNEY,
HAROLD SERRELL.